United States Patent [19]

Bongers et al.

[11] Patent Number: 4,757,131

[45] Date of Patent: Jul. 12, 1988

[54] PRODUCTION OF HIGH-MOLECULAR POLYTETRAMETHYLENE ADIPAMIDE PELLET

[75] Inventors: Antonius J. P. Bongers, Born; Eize Roerdink, Beek (L.), both of Netherlands

[73] Assignee: Stamicarbon B.V., Geleen, Netherlands

[21] Appl. No.: 935,221

[22] Filed: Nov. 26, 1986

[30] Foreign Application Priority Data

Jul. 22, 1986 [NL] Netherlands .................. 8601893

[51] Int. Cl.$^4$ .................................. C08G 69/46
[52] U.S. Cl. .............................. 528/335; 525/420; 528/502
[58] Field of Search ............... 528/335, 502; 525/420

[56] References Cited

U.S. PATENT DOCUMENTS

| 4,408,036 | 10/1983 | Gaymans et al. | 528/335 |
| 4,446,304 | 5/1984 | Gaymans et al. | 528/335 |
| 4,460,762 | 7/1984 | Gaymans et al. | 528/335 |

Primary Examiner—Harold D. Anderson
Attorney, Agent, or Firm—Cushman, Darby & Cushman

[57] ABSTRACT

The invention relates to a method for the production of high-molecular polytetramethylene adipamide in a two-step process in which the prepolymer particles obtained in the first process step are compressed into pellets which are subjected to the after-condensation reaction. The obtained high-molecular polytetramethylene adipamide pellets can be used without further shaping through e.g. melt extrusion.

16 Claims, No Drawings

PRODUCTION OF HIGH-MOLECULAR POLYTETRAMETHYLENE ADIPAMIDE PELLET

The invention relates to a method for the production of high-molecular polytetramethyleneadipamide.

The preparation of high-molecular polytetramethyleneadipamide is known from e.g. EP-B-0039524 corresponding to U.S. Pat. No. 4,408,036 and 0038094 corresponding to U.S. Pat. No. 4,460,762, in which the process is carried out in two steps, viz. a pre-condensation reaction between 1.4-diaminobutane and adipic acid, resulting in a prepolymer with a number-average molecular weight of less than approx. 10,000, which is subsequently after-condensed in the solid phase. Before the prepolymer is subjected to the after-condensation reaction, it is ground to particles with an average diameter ranging from 0.1 to 0.5 mm. The after-condensation is carried out in a tumbling dryer or in a different reactor in which the particles are continuously in motion.

In practice, an economical large-scale application of such a method or after-condensation and conversion into a continuous process appears to be difficult to realize. When using a tumbling dryer, fouling of the wall, which may lead to lump formation and a coloured product, appears to occur frequently, as a result of the sintering and caking of the after-condensating particles. Besides the high-molecular product resulting from the after-condensation must be melted and extruded into pellets, in which form it is tradeable.

Processes carried out in the melt offer certain advantages in this respect. They are described in EP-A-160337. A disadvantage is that because the melting point of this polytetramethyleneadipamide lies very close to its decomposition temperature, the temperatures have to be controlled very accurately and the residence times restricted. The result of the latter is that it becomes very difficult to realize high molecular weights in one process. After-condensation in the solid phase shall have to take place subsequently anyhow. This is preferably carried out with a polymer consisting of particles of a defined size, obtained e.g. by melt extrusion, in which case the previously mentioned disadvantages of the after-condensation of small particles do not occur. However, this is a rather time-consuming procedure and the first part of the after-condensation process in the melt is sensitive to interference.

The aim of the invention is therefore to provide a method for the production of high-molecular tetramethyleneadipamide which does not show these disadvantages and can be carried out continuously on a technical scale. By a simple means the inventors have now succeeded in bringing the prepolymer obtained from the first condensation reactor into such a form which renders it suitable for after-condensation in the solid phase in one continuous process, requiring no additional processing step, such as melt extrusion, to bring the obtained high-molecular product into a form which renders it suitable for further processing.

The method according to the invention for the production of high-molecular polyamide, consisting mainly of $-NH-(CH_2)^4-NH-CO-(CH_2)_4-CO$-units, by first producing polyamide prepolymer particles with a number-average molecular weight of less than approximately 10,000 by means of a condensation reaction between 1,4-diaminobutane and adipic acid and subsequent after-condensation of the prepolymer in the solid phase, is characterized in that the prepolymer particle mass is subsequently compressed into pellets, which are subjected to the after-condensation reaction.

The polyamide according to the invention consists mainly of tetramethyleneadipamide units, e.g. at least 75% of the number of units; in special cases this concentration may be even less, providing the melting point is not lowered to such an extent that the duration of the after-condensation reaction in the solid phase becomes unacceptably long. All known amide-forming substances may be used as copolymerisation components, e.g. amino acids, lactams, diamines and dicarboxylic acids, but other copolymer components such as esters and imide-forming substances may also be used.

The number of tetramethyleneadipamide units is preferably at least over 85%, a concentration of at least 90% offers greater advantages.

For the pre-condensation reaction the individual monomers or salts thereof may be used. It is advantageous to use an excess of amine. The polymerisation may take place in either the solid or the liquid phase as described in e.g. EP-B-0039524 corresponding to U.S. Pat. No. 4,408,036. The pre-condensation reaction is continued until a product is obtained with a number-average molecular weight of less than approximately 10,000, preferably between 500 and 5000.

For a continuous process it is advantageous to obtain the reactor contents in liquid form while simultaneously releasing the pressure, but the product may also be obtained from the pre-condensation reactor in a different way.

The resulting prepolymer is subsequently given the required particle size, by e.g. grinding. The size of the particles may in principle vary over a wide range, e.g. from 1 $\mu$m to 20 mm, more particularly from 10 $\mu$m to 1 mm and preferably from 30 to 650 $\mu$m, and depends on e.g. the required molecular weight distribution in the end product and the possibilities of the equipment used for the compression. The indicated range covers at least 95 wt.% of the prepolymer particle mass. Spray-drying the reactor contents offers particular advantages enabling a regular particle mass to be obtained in a reproducible manner without intermediate processing. In spray-drying the autogenous pressure built up in the prepolymerisation reactor is utilized with advantage.

The particle mass obtained in the manner described above is subsequently compressing into moulded shapes, hereinafter to be termed pellets, according to known procedures. Applicable procedures are e.g. described in Perry's Chemical Engineer's Handbook, 4th Edition, Mc. Graw, H. II, New York, 8–62/64 (1963) (1) and include e.g. tabletting with a rotary press. Pressing is preferably carried out at temperatures below the melting point of the polyamide, e.g. at temperatures below 200° C., preferably below 100° C. In principle, any shape may be chosen for the pellets, but cylindrical or spherical pellets are preferable. The size of the pellets may vary over a wide range and is determined mainly by the requirements of the shape of the conditions in the after-condensation reactor and by the requirements of the equipment used to process the obtained high-molecular product. The dimensions may vary from e.g. 1 to 20 mm. Cylindrical after-condensed pellets, which are fed via standard hoppers into processing equipment such as extruders, are preferably given a diameter ranging from 1.5 to 5 mm with a length from 3 to 10 mm. It is surprising that without the addition of any binding agent pellets are obtained which can easily be handled without disintegrating, and retain their shape during the after-condensation step. These pellets are subsequently, without further processing, fed into a second reactor, in which, under e.g. the reaction conditions known from e.g. EP-B-0038094 corresponding to U.S. Pat. No. 4,408,036, the after-condensation into high-molecular polymer takes place in a water-vapour-containing inert gaseous atmosphere at a temperature of at least 200° C.

This after-condensation may be carried out in all known reactors suitable for this purpose, such as tumbling dryers, fluidized bed reactors etc. It is preferable to use a so-called moving packed bed reactor with continuous feed of the prepolymer pellets at the top and discharge of end products at the bottom for a continuous process. Perry defines such a reactor as a 'gravity vessel' (see (1) 20–35 etc.). Within the packed bed moving under the influence of gravity the pellets are not mixed any further. During this after-condensation process the mechanical strength of the pellets further increases, so that the end product can be bagged or poured into containers without further processing and without an unacceptable amount of fines being produced.

The high-molecular polytetratmethyleneadipamide obtained according to the method of the invention appears to lead to better spinning results than polytetramethyleneadipamide obtained according to the method described in example 1 of EP-B-0038094 which is subsequently melted and formed into granulate.

Another advantage of the method according to the invention is that the water content of the prepolymer article mass may vary over a wide range without causing problems such as lump formation during the after-condensation reaction; e.g. from 1 to 30 wt.%, based on the total weight. This makes it unnecessary to supply additional heat to the spraying areas or to take special precautions for possible intermediate storage of the powdered prepolymer mass. Depending on the type of equipment used for making the pellets, a water content from 2 to 15% in the prepolymer particle mass offers certain advantages. If so desired, the water content of the pellets can be controlled by adding additional water to the prepolymer mass.

The invention will now be further elucidated by means of the following examples and comparative examples, without, however being restricted thereto.

EXAMPLE I

The prepolymer particle mass was obtained by adding approx. 1 kg of diaminobutane and 12 kg of water to 147 kg of nylon 4.6 salt and letting this react for approx. 25 minutes at 207° C. in a closed reactor, during which time the pressure increased to 12.5 bar (1.25 MPa). The contents of the reactor was subsequently discharged via a spray nozzle into an area with nitrogen at atmospheric pressure. As a result of the heat present in the droplets, the water present in the reactor mass was almost completely evaporated and the sprayed droplets cooled. The resulting prepolymer particle mass had particle sizes ranging from 30 to 650 $\mu$m. The number-average molecular weight was approx. 1000, the water content being 9%.

2 kg of the prepolymer particle mass obtained according to the method described above was fed to a laboratory press with a horizontal flat die and a head equipped with two vertical mill-stones. The die is provided with holes with a diameter of 3 mm and a length of 9 mm. Beneath the die are knives for adjusting the required length of the pellets. Coherent pellets were obtained at 60° C. and at an output of 39.2 kg/h. Afer-condensation in a tumbling dryer for 5 hours at 255° C. in a nitrogen atmosphere containing 25% water vapour (mass basis) resulted in a white after-condensate with $\eta_{rel}=3.7$ (measured on a solution of 1 gram in 100 ml 96 weight % sulfuric acid). The concentration of fines <1 mm was 0.6 wt.%.

EXAMPLE II 2 kg of the prepolymer particle mass from example I was mixed with water in a mixer to a total water content of 26 wt.%. This particle mass was processed into pellets using compressing machine, Granuliermaschine G 1/100/160 S manufactured by Alexander Aktiengesellschaft at Remscheid, West-Germany.

The compressing machine concerned consists of two cylinders, one of which, the granulating cylinder, is power-driven and is provided with equally distributed identical pierced holes. No power is applied to the smooth pressure cylinder, which presses the particle mass poured into the top part of the gap between the rolls through the pierced holes of the granulating cylinder, on the inside of which are knives for shearing the pellets. Regularly shaped pellets with a diameter of 2 mm and a length varying from 1 to 4 mm were obtained at a temperature of 30° C.

EXAMPLE III

A prepolymer powdered mass was produced according to the method described in Example I. Since 5 instead of 12 kg of water were added to the reactor, the water content of the prepolymer powdered mass was only 3.3%. The number-average molecular weight of the prepolymer was approx. 1200.

The entire mass of powdered prepolymer thus obtained was processed into pellets in a compressing machine of type GCS 200/40 manufactured by Bepex at Leingarten, West-Germany. This compressing machine operates on the principle of two interlocking tooth wheels provided with pierced holes through which the particle mass is compressed. With holes with a diameter of 2 mm and a length of 4 mm, hard white pellets with a length varying from 5 to 20 mm were obtained at approximately 70° C.

An externally insulated steel column with a diameter of 15 cm and a height of 150 cm was filled with 14 kg of pellets. The column and its contents were heated with a $N_2$ gas flow containing 25 wt.% water vapour to a temperature of 255° C., which temperature was subsequently maintained.

On reaching this temperature, approx. 2.5 kg of pellets were discharged per hour from the bottom of the column and the same amount of prepolymer pellets were added at the top of the column. The relative viscosity of this discharged polymer, which was white, was determined. These values are given in the following table.

| duration | 5 | 6 | 7 | 8 | 9 | 19 |
|---|---|---|---|---|---|---|
| $\eta_{rel}$ | 3.9 | 3.7 | 3.7 | 3.6 | 3.6 | 3.7 |

For the duration the amount of time elapsed after the column had reached 255° C. was taken. $\eta_{rel}$ was determined in a solution containing 1 gram in 100 ml of 96 wt.% sulphuric acid at 25° C. The product discharged from the column contained 0.40 wt.% fines smaller than 1 mm.

EXPERIMENT IV

This is a repetition of experiment III, however, with the difference that 5 wt.% ε-caprolactam, based on the nylon 4.6 salt, was added to the prepolymerisation reaction. The resulting prepolymer particle mass had a number-average molecular weight of approx. 1200. This time, however, the temperature of the column for the continuous after-condensation was increased to 240° C. and the residence time of the mass in the column was prolonged to 16 hours. This results in a high-molecular white product. Once the column had become stationary, $\eta_{rel}$ was 3.7. The amount of fines discharged along with the end product was 0.42 wt.%.

We claim:

1. A method for producing a high molecular weight polyamide pellet consisting substantially of units having the formula

—NH—(CH$_2$)$_4$—NH—CO—(CH$_2$)$_4$—CO— comprising:
 (1) condensing 1,4-diamino butane and adipic acid to produce a solid polyamide prepolymer particle mass, said polyamide prepolymer have a number-average molecular weight of less than approximately 10,000;
 (2) compressing said prepolymer particle mass into pellets; and
 (3) thereafter after-condensing said pellets in the solid phase at a temperature above 200° C., under a water-vapor-containing atmosphere until said high molecular weight polyamide is obtained having a number average molecular weight of at least 15,000.

2. Method according to claim 1 wherein the prepolymer in the liquid state is spray dried to obtain said prepolymer particle mass.

3. Method according to claim 1 wherein said pellets are formed by compressing without the addition of a binding agent.

4. Method according to claim 1 wherein said after-condensation reaction is carried out in a continuous process.

5. Method according to claim 4 wherein said after-condensation reaction is carried out in a moving bed reactor.

6. Method according to claim 1, wherein said prepolymer particle mass contains from 1–30 wt.% of water.

7. Method according to claim 1, wherein said prepolymer mass contains from 2–15 wt.% of water.

8. Method according to claim 1 wherein said prepolymer particle mass contains particles having dimensions less than 2,000 μm.

9. Method according to claim 1 wherein the prepolymer particle mass is composed of particles having dimensions between 10 μm and 1,000 μm.

10. Method according to claim 1 wherein the prepolymer particle mass contains particles having dimensions between 30 μm and 650 μm.

11. Method according to claim 1 wherein said prepolymer number-average molecular weight is between 500 and 5,000.

12. Method according to claim 1 wherein said pellets have dimensions ranging from 1 to 20 mm.

13. Method according to claim 1 wherein said pellets have a diameter ranging from 1.5 to 5 mm and a length ranging from 3.0 to 10 mm.

14. A pellet composed of compressed fine particles of a prepolymer polyamide consisting substantially of units having the formula

—NH—(CH$_2$)$_4$—NH—CO—(CH$_2$)$_4$—CO— with a number-average molecular weight of less than approximately 10,000, formed by condensing 1,4-diaminobutane and adipic acid to produce said polyamide prepolymer, and in the form of a particle mass having particles ranging in size from 10 μm to 1 mm which have been compressed into pellets having dimensions ranging from 1 to 20 mm.

15. Pellet according to claim 14, wherein said particle size range is from 30 to 650 μm.

16. Pellet according to claim 14, having a diameter ranging from 1.5 to 5 mm and a length from 3 to 10 mm.

* * * * *

UNITED STATES PATENT OFFICE
CERTIFICATE OF CORRECTION

PATENT NO. : 4,757,131
DATED : July 12, 1988
INVENTOR(S) : BONGERS, et al

It is certified that error appears in the above-identified patent and that said Letters Patent is hereby corrected as shown below:

Column 1, Line 22 - "or" should read "of."

Column 1, Line 62 - "NH-$(CH_2)^4$-NH-CO-$(CH_2)_4$-CO" should read "NH-$(CH_2)_4$-NH-CO-$(CH_2)_4$-CO."

Column 3, Line 23 - "polytetratmethyleneadipamide" should read "polytetramethyleneadipamide."

Column 5, Line 1 - "EXPERIMENT" should read "EXAMPLE."

Column 5, Line 3 - "experiment" should read "example."

Signed and Sealed this

Twenty-seventh Day of June, 1989

Attest:

DONALD J. QUIGG

*Attesting Officer*     *Commissioner of Patents and Trademarks*